A. CORPEE AND A. KRAFT.
TURNTABLE.
APPLICATION FILED JAN. 24, 1920.

1,354,285.

Patented Sept. 28, 1920.
3 SHEETS—SHEET 1.

Inventor
Alfred Kraft.
Adolph Corpee.
By Harry C. Schroeder
Attorney

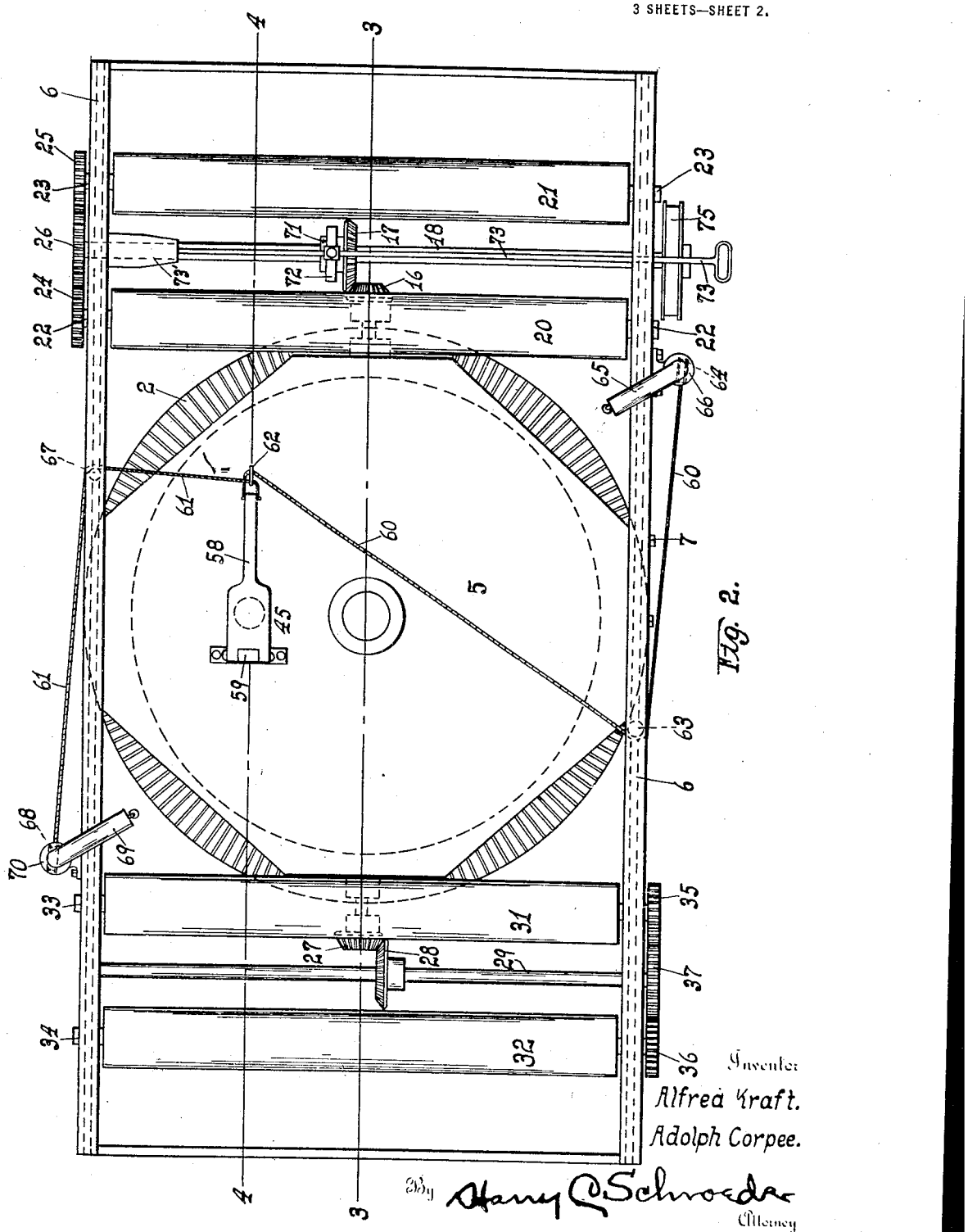

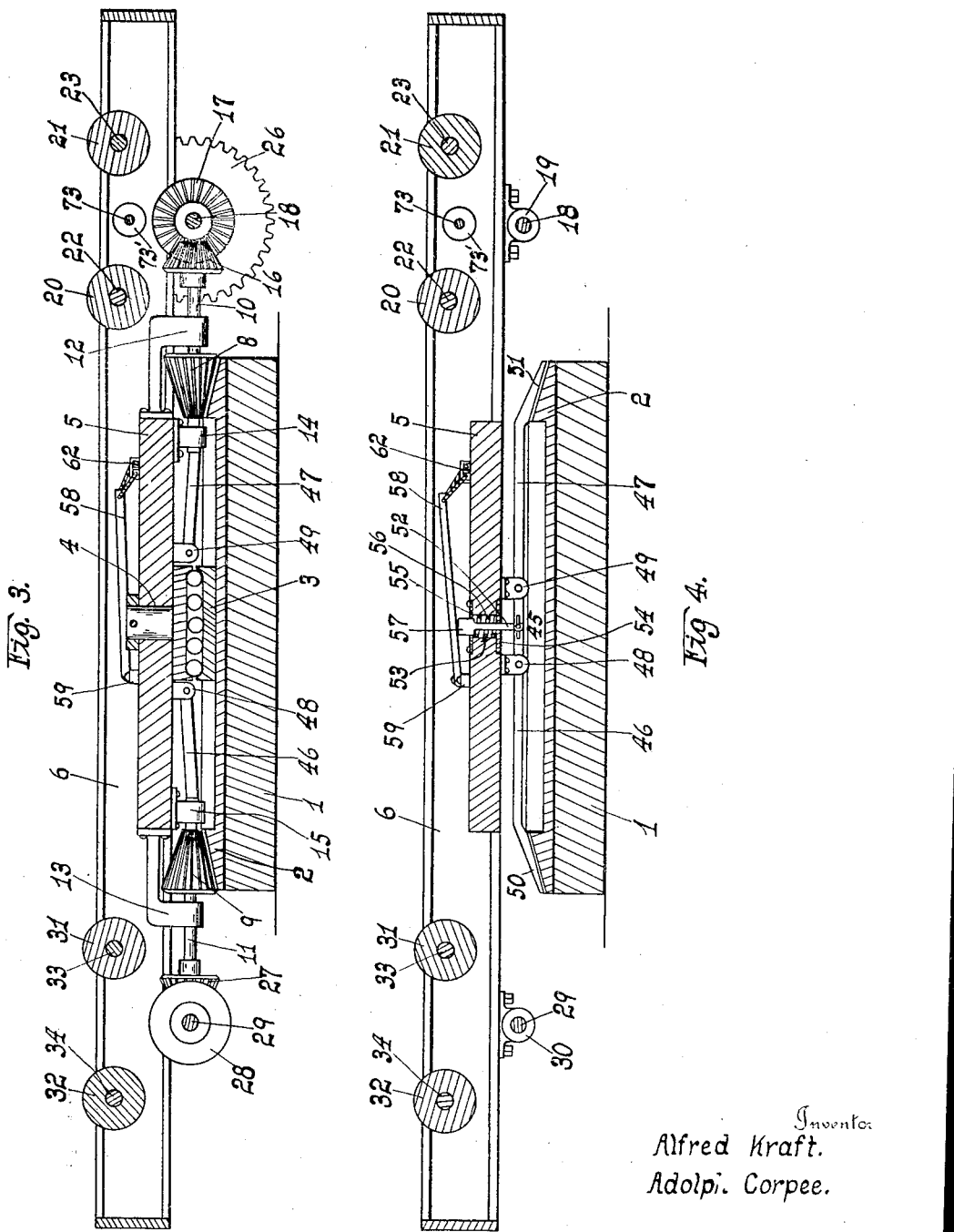

UNITED STATES PATENT OFFICE.

ADOLPH CORPEE AND ALFRED KRAFT, OF OAKLAND, CALIFORNIA.

TURNTABLE.

1,354,285.   Specification of Letters Patent.   Patented Sept. 28, 1920.

Application filed January 24, 1920. Serial No. 353,791.

*To all whom it may concern:*

Be it known that we, ADOLPH CORPEE and ALFRED KRAFT, citizens of the United States, residing at Oakland, in the county of Alameda and State of California, have invented certain new and useful Improvements in Turntables, of which the following is a specification.

Our invention is a turntable upon which automobiles may be turned around by the application thereto of the power of the automobiles. Our turntable may also be used as a power plant, by utilizing the power of an automobile thereon.

Referring to the annexed drawings, which form a part of this specification:

Fig. 2 is a plan of our turntable with the floor thereof removed.

Fig. 3 is a vertical longitudinal section of our turntable taken on line 3—3 of Fig. 2.

Fig. 4 is a vertical longitudinal section of our turntable taken on line 4—4 of Fig. 2.

Figure 1:
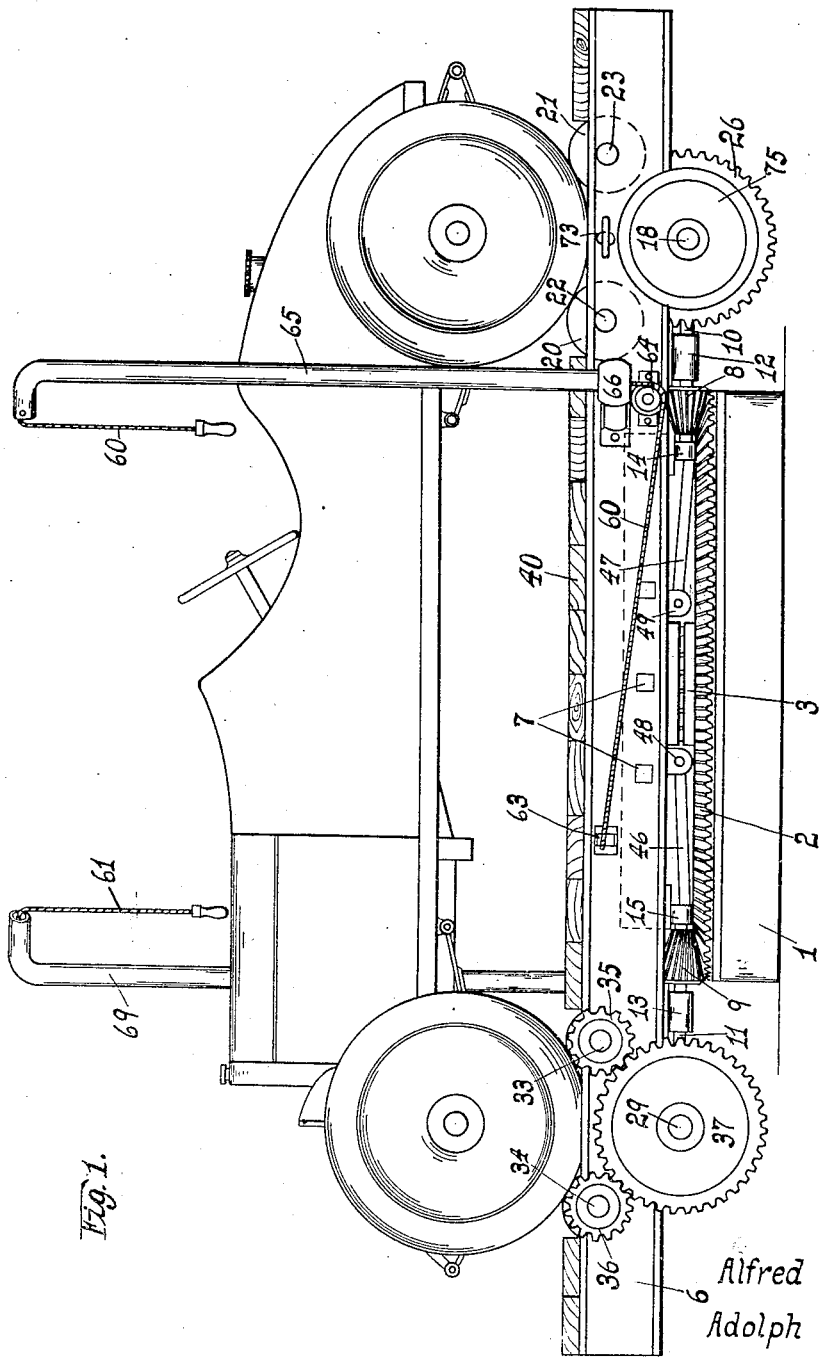
Figure 1 is a side elevation of our turntable and an automobile thereon.

In the drawings 1 indicates a base upon which is mounted a horizontal beveled gear 2 and a ball bearing 3 in the center of said beveled gear. Said ball bearing has an axial upstanding vertical stud which projects through an aperture 4 in a plate 5 resting upon the upper member of said ball bearing. Upon the plate 5 is mounted a horizontal rectangular frame 6, the side members of said frame being secured near their lower edges midway between their ends to the side edges of said plate by bolts 7. Pinions 8 and 9 meshing with beveled gear 2 are secured on shafts 10 and 11 journaled in bearings 12 and 13 secured respectively to the rear and front edges of the plate 5, and in bearings 14 and 15 secured to the under side of said plate. On the rear end of the shaft 10 is secured a beveled pinion 16 which meshes with a beveled gear 17 secured on a shaft 18 extending transversely under the frame 6 near the rear end thereof and journaled in bearings 19 secured to the lower edges of the side members of said frame. Rollers 20 and 21 are mounted transversely in the upper part of the frame 6 above the shaft 18 a short distance apart forwardly and rearwardly of said shaft, on transverse shafts 22 and 23 which are journaled in the side beams of the frame 6. On one end of shafts 22 and 23 are secured pinions 24 and 25 which mesh with a gear 26 on one end of shaft 18. On the forward end of shaft 11 is secured a beveled pinion 27 which meshes with a beveled gear 28 secured on a shaft 29 extending transversely under the frame 6 near the forward end thereof and journaled in bearings 30 secured to the lower edge of the side beams of the frame 6. Rollers 31 and 32 are mounted transversely in the upper part of frame 6 above the shaft 29 a short distance apart, rearwardly and forwardly of said shaft, on transverse shafts 33 and 34 which are journaled in the side beams of said frame. On one end of shafts 33 and 34 are secured pinions 35 and 36 which mesh with a gear 37 on one end of shaft 29. A floor 40 is laid on the frame 6 between the forward end thereof and roller 32, between the rollers 31 and 20 and between the roller 21 and the rear end of the frame, the upper surface of said floor resting flush with the upper surface of the rollers 32, 31, 20 and 21.

A lock 45 is provided for locking the turntable against turning. Said lock includes a pair of latch levers 46 and 47 pivoted in brackets 48 and 49 secured to the under side of plate 5, on the outer ends of which levers are latches 50 and 51 for engaging the teeth of the gear 2 to prevent rotation of frame 6. The inner ends of the levers are slotted and connected to the lower end of a plunger 52 which extends vertically through an aperture 53 in the plate 5 and through bearing plates 54 and 55 secured to said plate over the lower and upper ends of said aperture. A spring 56 surrounds the plunger 52 within the aperture 53, bearing at one end against plate 54 and at its other end against the head 57 at the upper end of the plunger, said spring normally maintaining the latch 50 and 51 in engagement with the teeth of gear 2, locking the turntable. A presser lever 58 is pivoted at 59 on the upper side of the plate 5 over the plunger head 57. Ropes 60 and 61 are secured to the free end of the lever 58. The rope 60 extends through a staple 62 secured to the plate 5, then over a pulley 63 mounted on one side beam of frame 6, then over another pulley 64 mounted on said beam near roller 20 and then up through a tube 65 mounted in a bracket 66 secured to the outside of said beam, the upper end of said tube extending inwardly.

The rope 61 extends through staple 62, then over a pulley 67 mounted on the other side beam of frame 6, then over another pulley 68 mounted on said beam near roller 31 and then up through a tube 69 mounted in a bracket 70 secured to the outside of said beam, the upper end of said tube extending inwardly over the turntable.

The beveled gear 17 is feathered on the shaft 18 and is provided with an annular groove 71 in its hub which is engaged by an arm 72 secured to a shifting rod 73 extending over the shaft 18 through one side beam of the frame 6 and into a bearing 73' on the other side beam of the frame, by means of which rod the beveled gear 17 may be shifted into and out of engagement with beveled pinion 16. A pulley 75 is secured on one end of shaft 18.

In operation an automobile may be run over the floor 40 of the turntable until the rear wheels of the automobile rest upon rollers 20 and 21 and the front wheels rest upon rollers 31 and 32. Upon pulling cord 60, the lever 58 presses the plunger 52 down and disengages the latches 51 from the gear 2, unlocking the turntable, and upon running the automobile the rollers 20 and 21 are rotated by the rear automobile wheels, whereupon the frame 6 and the parts mounted thereon and the automobile are rotated through the medium of gears 24 and 25, gear 26, shaft 18, gear 17, pinion 16, shaft 10, pinion 8 and gear 2, until the automobile is turned around. Upon releasing cord 60, the turntable is again locked by the action of spring 56 and the automobile will run off the locked rollers 20 and 21, and 31 and 32 and off the turntable. The turntable is operative when the automobile is run upon it from either end and the rear automobile wheels engage either the rollers 20 and 21 or the rollers 31 and 32.

Upon shifting the gear 17 out of engagement with gear 16, the rollers 20 and 21 may be rotated by the rear wheels of an automobile and the pulley 75 rotated for power purposes through the medium of gears 24 and 25, and 26, and shaft 18, without turning the turntable, thus utilizing the turntable as a power plant.

Having described our invention, we claim:

1. In a turntable, a stationary gear, a turnable automobile supporting frame, a pair of rollers journaled in said frame, gears on the shafts of said rollers, a shaft journaled in said frame, a gear on said shaft meshing with said roller gears, a beveled gear on said shaft, a pinion shaft journaled upon said frame, a pair of pinions on said shaft, one of said pinions meshing with said stationary gear and the other pinion meshing with the beveled gear on said shaft.

2. In a turntable, a stationary gear, a turnable automobile supporting frame, a pair of rollers journaled in said frame, gears on the shafts of said rollers, a shaft journaled in said frame, a gear on said shaft meshing with said roller gears, a beveled gear on said shaft, a pinion shaft journaled upon said frame, a pair of pinions on said shaft, one of said pinions meshing with said stationary gear and the other pinion meshing with the beveled gear on said shaft, and a pulley on said shaft, and means for shifting said beveled gear out of engagement with the pinion in mesh therewith.

3. In a turntable, a stationary gear, a turnable automobile supporting frame, a pair of rollers journaled in said frame, gears on the shafts of said rollers, a shaft journaled in said frame, a gear on said shaft meshing with said roller gears, a beveled gear on said shaft, a pinion shaft journaled upon said frame, a pair of pinions on said shaft, one of said pinions meshing with said stationary gear and the other pinion meshing with the beveled gear on said shaft, and a pulley on said shaft, means for shifting said beveled gear out of engagement with the pinion in mesh therewith, and a lock for locking said supporting frame against turning when said beveled gear and pinion are out of mesh.

4. In a turntable, a horizontal beveled gear, a plate rotatably mounted upon said gear, an automobile supporting frame mounted on said plate, a pair of rollers journaled in said frame, a shaft journaled in said frame, a pinion secured on the shaft of each roller, a gear secured on said shaft and meshing with said pinions, a beveled gear on said shaft, a pinion shaft journaled in a bracket on said plate, two pinions on said pinion shaft, meshing respectively with the beveled gear on said shaft and with said horizontal beveled gear, a latch normally engaging said horizontal gear and locking said turntable against turning, and means within reach of the automobile driver for unlocking said latch and gear.

5. In a turntable, a horizontal beveled gear, a plate rotatably mounted upon said gear, an automobile supporting frame mounted on said plate, a pair of rollers journaled in said frame, a shaft journaled in said frame, a pinion secured on the shaft of each roller, a gear secured on said shaft and meshing with said pinions, a beveled gear on said shaft, a pinion shaft journaled in a bracket on said plate, two pinions on said pinion shaft, meshing respectively with the beveled gear on said shaft and with said horizontal beveled gear, a latch lever mounted on the under side of said plate, a latch on one end of said lever for engaging said horizontal gear, a plunger mounted in said plate, a spring engaging said plunger and normally maintaining said latch in engagement with said horizontal gear, a presser lever mounted on said plate over the top of said plunger, a vertical tube mounted on said frame, and a rope connected to said presser lever and extending through said tube within reach of the automobile for drawing said presser lever down upon said plunger and releasing said latch from said gear.

In testimony whereof we affix our signatures.

ADOLPH CORPEE.
ALFRED KRAFT.